(12) United States Patent
Eaton et al.

(10) Patent No.: US 10,011,504 B2
(45) Date of Patent: Jul. 3, 2018

(54) METHOD AND APPARATUS FOR SEPARATING SALTS FROM A LIQUID SOLUTION

(71) Applicant: Pureleau Ltd., North Saanich (CA)

(72) Inventors: Gregor McGregor Eaton, Victoria (CA); Lawrence Arthur Lambert, Ladysmith (CA); David Cecil Taylor, Calgary (CA)

(73) Assignee: PURELEAU LTD., North Saanich (CA)

( * ) Notice: Subject to any disclaimer, the term of this patent is extended or adjusted under 35 U.S.C. 154(b) by 60 days.

(21) Appl. No.: 14/932,417

(22) Filed: Nov. 4, 2015

(65) Prior Publication Data

US 2016/0130161 A1 May 12, 2016

Related U.S. Application Data

(60) Provisional application No. 62/075,166, filed on Nov. 4, 2014.

(51) Int. Cl.
   *C02F 1/46* (2006.01)
   *C02F 1/48* (2006.01)
   *C02F 1/461* (2006.01)

(52) U.S. Cl.
   CPC .............. *C02F 1/4604* (2013.01); *C02F 1/48* (2013.01); *C02F 1/46109* (2013.01)

(58) Field of Classification Search
   None
   See application file for complete search history.

(56) References Cited

U.S. PATENT DOCUMENTS

| | | | |
|---|---|---|---|
| 3,883,412 | A | 5/1975 | Jensen |
| 4,642,504 | A | 2/1987 | Jacobsen |
| 5,425,858 | A | 6/1995 | Farmer |
| 5,936,004 | A | 8/1999 | Altmeier |

(Continued)

FOREIGN PATENT DOCUMENTS

EP    2 383 757 A1    11/2011

OTHER PUBLICATIONS

Yoram Oren, "Capacitive Deionization (CDI) for Desalination and Water Treatment—past, present and future (a review)", *Science Direct*, 228, pp. 10-29, (2008).

(Continued)

*Primary Examiner* — Ibrahime A Abraham
*Assistant Examiner* — Salil Jain
(74) *Attorney, Agent, or Firm* — Brinks Gilson & Lione

(57) ABSTRACT

An apparatus and method for removing a salt from a source solution is provided. The apparatus comprises a feed vessel, a collection vessel, and an ion transport channel in ionic communication with the feed vessel and the collection vessel. A plurality of electrodes is arranged along the ion transport channel.

The method comprises receiving the source solution in a feed vessel, receiving the sink solution in a collection vessel, and applying periodic voltage signals to a plurality of electrodes arranged along an ion transport channel which is in ionic communication with the feed vessel and the collection vessel. The periodic voltage signals applied to at least some of the respective electrodes are phase offset to induce the ions to move through the ion transport channel from the source solution to the sink solution.

11 Claims, 17 Drawing Sheets

(56) References Cited

U.S. PATENT DOCUMENTS

| | | | |
|---|---|---|---|
| 6,090,259 | A | 7/2000 | Fajt et al. |
| 6,096,179 | A | 8/2000 | Fajt et al. |
| 6,284,124 | B1 | 9/2001 | DiMascio et al. |
| 6,309,532 | B1 | 10/2001 | Tran et al. |
| 6,325,907 | B1 | 12/2001 | Andelman |
| 6,580,598 | B2 | 6/2003 | Shiue et al. |
| 6,709,560 | B2 | 3/2004 | Andelman et al. |
| 7,833,400 | B2 | 11/2010 | Andelman et al. |
| 7,981,268 | B2 | 7/2011 | Bourcier et al. |
| 8,002,963 | B2 | 8/2011 | Andelman et al. |
| 8,088,267 | B2 | 1/2012 | James et al. |
| 2007/0170060 | A1 | 7/2007 | Bourcier et al. |
| 2008/0078672 | A1 | 4/2008 | Atlas |
| 2008/0105551 | A1 | 5/2008 | Wang et al. |
| 2008/0107542 | A1 | 5/2008 | Hernandez |
| 2008/0185346 | A1 | 8/2008 | Xiong et al. |
| 2009/0255815 | A1 | 10/2009 | Shiue et al. |
| 2009/0314718 | A1 | 12/2009 | Sparrow et al. |
| 2010/0065510 | A1 | 3/2010 | Krichtafovitch et al. |
| 2010/0230277 | A1 | 9/2010 | Sullivan et al. |
| 2011/0011801 | A1* | 1/2011 | Cho .................. C02F 1/4602 210/651 |
| 2011/0147212 | A1 | 6/2011 | Kim et al. |
| 2011/0163273 | A1 | 7/2011 | Baca et al. |
| 2011/0284376 | A1 | 11/2011 | Ng et al. |
| 2012/0199486 | A1 | 8/2012 | Kang et al. |
| 2012/0247959 | A1 | 10/2012 | Seed et al. |
| 2014/0374236 | A1* | 12/2014 | Moore .................. C05F 7/00 204/155 |
| 2016/0280569 | A1* | 9/2016 | Yeung .................. C02F 1/46109 |

OTHER PUBLICATIONS

Jae-Sook Kim, Jae-Hwan Choi, "Fabrication and Characterization of a Carbon Electrode Coated with Cation-Exchange Polymer for the Membrane Capacitive Deionization Applications", *Journal of Membrane Science*, 355, pp. 85-90, (2010).

Marc A. Anderson, Ana L. Cudero, and Jesus Palma, "Capacitive Deionization as an Electrochemical Means of Saving Energy and Delivering Clean Water. Comparison to Present Desalination Practices: Will it compete?", *Electrochimica Acta*, 55(12), pp. 3845-3856, (2010).

T.J. Welgemoed, C.F. Schutte, "Capacitive Deionization Technology™: An alternative desalination solution", *Desalination*, 183, pp. 327-340, (2005).

Tongwen Xu, "Ion Exchange Membranes: State of Their Development and perspective", *Journal of Membrane Science*, 263, pp. 1-29, (2005).

Romain Broseus et al., "Removal of Total Dissolved Solids, Nitrates and Ammonium Ions from Drinking Water Using Charge-Barrier Capacitive Deionisation", *Desalination*, 249, pp. 217-223, (2009).

Linda Zou, Gayle Morris, Daoduo Qi, "Using Activated Carbon Electrode in Electrosorptive Deionisation of Brackish Water", *Desalination*, 225, pp. 329-340, (2008).

Joseph C. Farmer et al., "Capacitive Deionization with Carbon Aerogel Electrodes: Carbonate, Sulfate, and Phosphate", *27th International Society for the Advancement of Materials Process Engineers Technical Conference*, Albuquerque, NM, (Oct. 9-12, 1995).

Fernando Valero et al., "Electrodialysis Technology. Theory and Applications.", *Desalination, Trends and Technologies*, (Feb. 2011).

Izaak Cohen et al., "Enhanced Charge Efficiency in Capacitive Deionization Achieved by Surface-Treated Electrodes and by Means of a Third Electrode", The *Journal of Physical Chemistry*, 115, 19856-19863, (2011).

Alberto M. Pernia et al., "Up-Down Converter for Energy Recovery in a CDI Desalination System", IEEE Transactions on Power Electronics, vol. 27, No. 7, pp. 3257-3265, (Jul. 2012).

Haibo Li et al., "A Comparative Study Between Membrane Capacitive Deionization and Capacitive Deionization from Isotherms and Kinetics", Nano-Micro *Letters*, (Jan. 10, 2012).

Dr. Steven Dietz, "Improved Electrodes for Capacitive Deionization", Proceedings of the 2004 NSF Design, *Service and Manufacturing Grantees and Research Conference*, Birmingham, AL, (Jan. 2004).

Ishan Barman et al., "Capacitive Deionization Process with Decoupled Charging and Discharging Flow Schemes", *The Fifth International Conference on Axiomatic Design*, (Mar. 25-27, 2009).

Batya A. Fellman, "Carbon-Based Electric Double Layer Capacitors for Water Desalination", Thesis for the Department of Mechanical Engineering, (May 19, 2010).

Robert Atlas, "Purification of Brackish Water using Hybrid CDI-EDI Technology", Abstract (2007).

Sanjay Tewari, "Carbon Aerogel Electrodes: Adsorption-Desorption and Regeneration Study for Purification of Water", Abstract.

Sung Jae Kim et al., "Direct seawater desalination by ion concentration polarization", Nature Nanotechnology, (Mar. 21, 2010).

Leonard P. Seed et al., "The Desel System—Capacitive Deionization for the Removal of Ions from Water", Abstract, (2006), Water Environment Foundation.

Jeong-Won Lee et al., "Electrosorption Behavior of $TiO_2$/Activated Carbon Composite for Capacitive Deionization", App. Chem. Eng., vol. 21, No. 3, (Jun. 2010), pp. 265-271.

M.D. Losego and JP Maria, "Reproducibility of and ferroelectric fatigue of lead zirconate titanate (PZT) thin films deposited directly on copper via a composite gel architecture." *J. American Ceram. Soc.* 93 3983 (2010).

M. Losego, J.Ihlefeld, J-P Maria, "The importance of solution chemistry in preparing a sol-gel PZT thin films on copper surfaces." *Chemistry Mat. Sci.*, 43 38 (2008).

M. Losego, L. Jimison, J. Ihlefeld, J-P Maria, "Ferroelectric response from Lead Zirconate titatnate thin films prepared directly on low-resistivity copper substrates." *Appl. Phys. Let.* 86 172906 (2005).

Hong—II Kim et al., "Effect of Pore Distribution of Activated Carbon Electrode on the Electosorptive Deionisation", Dept. of Industrial Engineering Chemistry, Chungbuk National University, 214th ECS Meeting, Abstract # 2936, *The Electochemical Society* (Oct. 15, 2008).

* cited by examiner

METHOD AND APPARATUS FOR SEPARATING SALTS FROM A LIQUID SOLUTION

CROSS-REFERENCE TO RELATED APPLICATIONS

This application claims the benefit of U.S. Provisional Application No. 62/075,166, filed Nov. 4, 2014, the entire contents of which are incorporated by reference.

BACKGROUND

The present disclosure relates to a method and apparatus for removing salts from a liquid solution.

Many parts of the world, and a substantial portion of the world's population, suffer from a shortage of water. Although the oceans cover about two-thirds of the earth's surface, this water is unsuitable for most agricultural uses and for domestic consumption because of its high salt concentration. Ocean water typically contains about 35 parts per thousand (ppt) of dissolved salts, including sodium chloride.

Various methods have been developed for removing salts from seawater. Conventional methods include ion exchange, reverse osmosis, electro dialysis, electro deposition, and filtering. In reverse osmosis systems, water is forced through a membrane, which acts as a filter for separating ions (and other impurities) from the water. Reverse osmosis systems suffer several disadvantages, including substantial energy consumption and membrane degradation.

Ion exchange systems, such as residential water softeners and boiler water treatment systems for nuclear and fossil fuel power plants, produce water having a relatively high concentration of sodium chloride. Thus, an additional desalination step, such as reverse osmosis, is needed in order to make the water suitable for human consumption.

Other methods have been proposed to address the shortcomings of the conventional separation processes. In a capacitive deionization (CDI) process, an electrical potential difference is applied over two porous carbon electrodes. Negatively charged ions (anions) are attracted to the electrode having the lower electrical potential (anode), while positively charged anions (cations) are attracted to the electrode having the higher electrical potential (cathode).

A CDI system cycles through two phases: an adsorption phase in which water is desalinated and a desorption phase which the electrodes are regenerated. During the adsorption phase, a potential difference is applied over the two electrodes, and ions are adsorbed from the water. When the electrodes become saturated with ions, regeneration is necessary. During regeneration, the potential difference between the electrodes is reversed or reduced to zero. The ions leave the electrode pores and can be flushed out of the CDI cell.

Despite the emergence of the CDI methods, limitations in the technology for separating salts from liquid solutions still exist.

SUMMARY OF THE INVENTION

An embodiment of the present disclosure relates to a method for removing a salt from a source solution. The method comprises supplying the source solution to a feed vessel, supplying a sink solution to a collection vessel, and applying periodic voltage signals to a plurality of electrodes arranged along an ion transport channel which is in ionic communication with the feed vessel and the collection vessel. The periodic voltage signals applied to at least some of the respective electrodes are phase offset to induce the ions to move through the ion transport channel from the source solution to the sink solution.

An embodiment of the present disclosure also relates to an apparatus for removing a salt from a source solution. The apparatus comprises a feed vessel, a collection vessel, and an ion transport channel in ionic communication with the feed vessel and the collection vessel. A plurality of electrodes are arranged along the ion transport channel.

BRIEF DESCRIPTION OF THE DRAWINGS

FIG. 6b is a sectional view of the apparatus depicted in FIG. 4a.

DETAILED DESCRIPTION

The present disclosure generally relates to an apparatus and method for removing a salt from a source solution.

Figure 1:
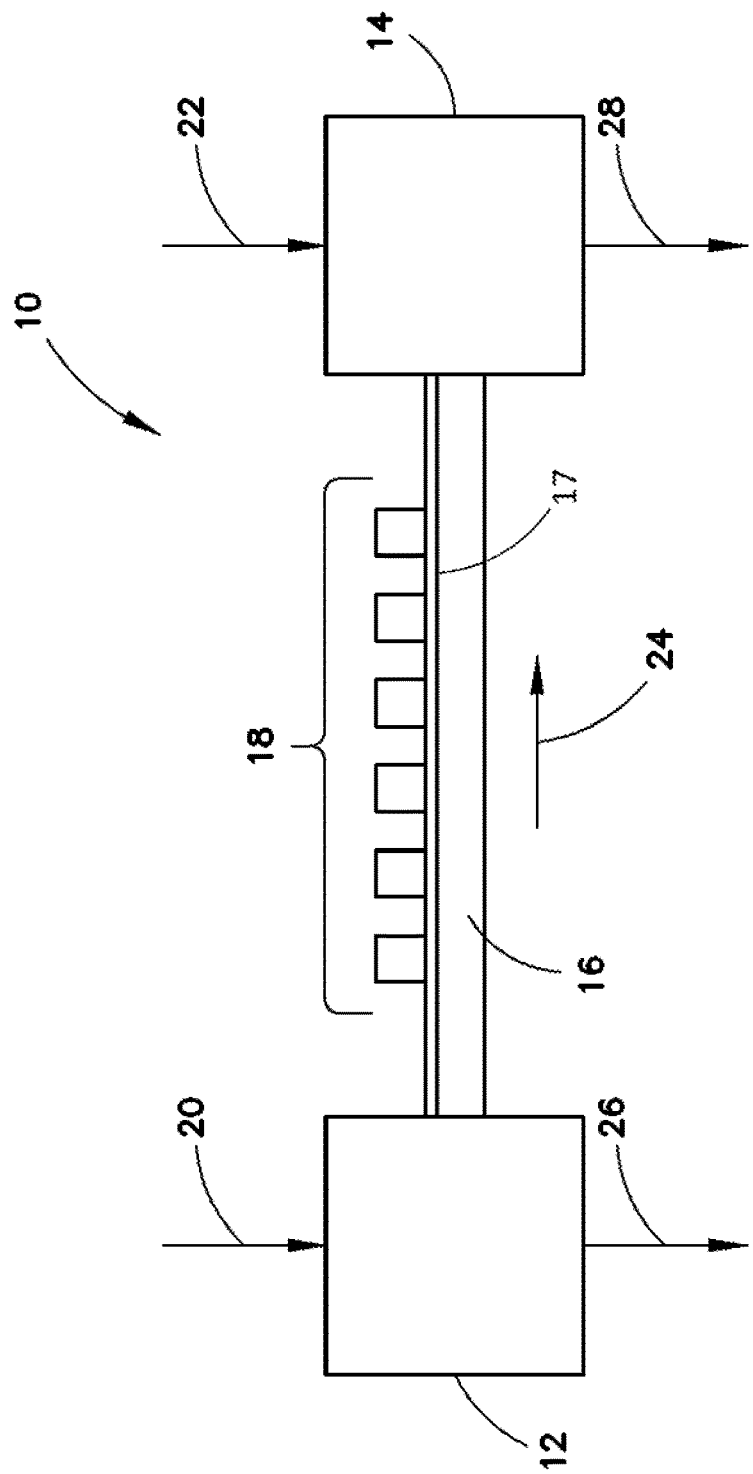
FIG. 1 is a schematic view of an apparatus and method for removing a salt from a source solution in accordance with one embodiment.

FIG. 1 is a schematic view of an apparatus 10 in accordance with an embodiment. The apparatus 10 comprises a feed vessel 12, a collection vessel 14, an ion transport channel 16 in ionic communication with the feed vessel 12 and the collection vessel 14, and a plurality of electrodes 18 arranged along the ion transport channel 16. The electrodes 18 may be arranged along a single side of the ion transport channel 16 (as shown in FIG. 1) or may be arranged along the ion transport channel 16 on multiple sides (not shown).

As shown in FIG. 1, a coating 17 optionally is disposed on the surfaces of the electrodes 18. It will be understood that a coating analogous to the coating 17 may be disposed on the surfaces of the electrodes depicted in FIGS. 2, 3, and 5-9, even where such coating is not depicted in such Figures.

Figure 2:
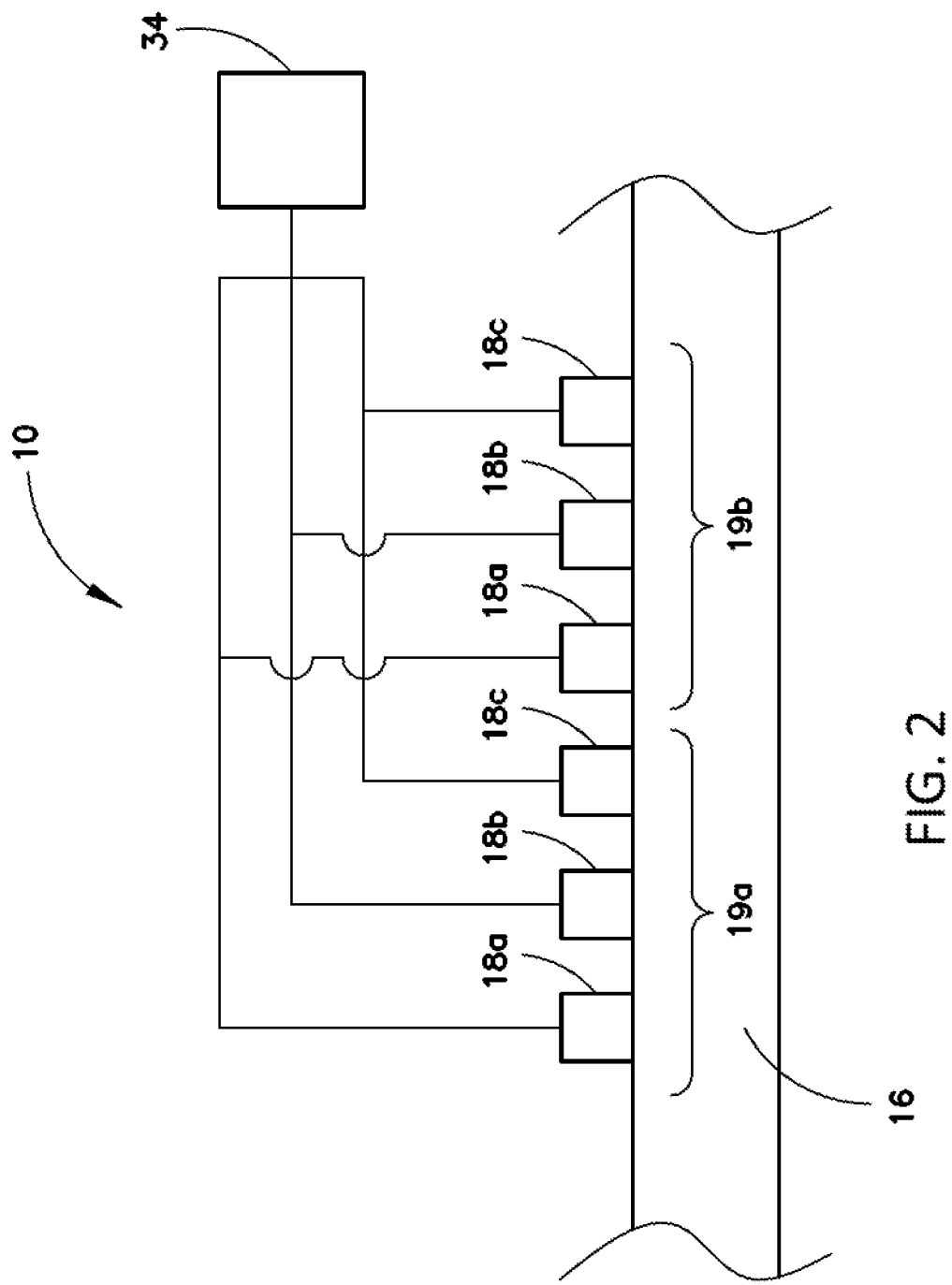
FIG. 2 is a partial schematic view of the apparatus depicted in FIG. 1.

Referring now to FIG. 2, in some embodiments, the apparatus 10 further comprises a voltage generation source, such as a multiphase voltage generator 34, electrically connected to the plurality of electrodes 18.

The plurality of electrodes 18 constitute one or more electrode groups 19 arranged along the ion transport channel 16. For example, the plurality of electrodes 18 may constitute one, two, three, four, five, six, seven, eight, nine, ten, eleven, twelve, thirteen, fourteen, fifteen, sixteen, seventeen, eighteen, nineteen, twenty, or more electrode groups 19 arranged along the ion transport channel 16. In an embodiment, the plurality of electrodes 18 constitutes between three and eighteen electrode groups 19, in another embodiment between five and fifteen electrode groups 19, and in yet another embodiment between six and twelve electrode groups 19.

Each electrode group 19 comprises a plurality of electrodes 18 arranged along the ion transport channel 16. For example, each electrode group 19 may comprise two, three, four, five, six, seven, eight, nine, ten, eleven, twelve, thirteen, fourteen, fifteen, sixteen, seventeen, eighteen, nineteen, twenty, or more electrodes 18 arranged along the ion transport channel 16. In an embodiment, each electrode group 19 comprises between two and eight electrodes 18, in another embodiment between 3 and 6 electrodes 18, and in yet another embodiment between three and five electrodes 18.

Regardless of the number of electrodes 18 in each electrode group, the electrodes within each electrode group can be arranged along the ion transport channel with the first electrode being closest to the feed vessel, the second electrode being next, followed by the third electrode, etc. The plurality of electrodes 18 making up each electrode group 19 may be segregated from the electrodes 18 making up adjacent electrode groups 19 (as shown in FIG. 2), or the electrodes 18 making up multiple electrode groups 19 may be intermingled along the ion transport channel 16 (not shown).

Each electrode 18 within each electrode group 19 is electrically connected to the multiphase voltage generator 34 in parallel with the corresponding electrodes 18 in the other electrode groups 19 and separately from the other electrodes 18. For example, the first electrodes 18 are connected in parallel to a first output of the multiphase voltage generator 34, the second electrodes 18 are connected in parallel to a second output of the multiphase voltage generator 34, ... the tenth electrodes 18 are connected in parallel to a third output of the multiphase voltage generator 34, etc.

In the embodiment shown in FIG. 2, the apparatus 10 comprises two electrode groups 19, namely a first electrode group 19a and a second electrode group 19b. Each electrode group 19 comprises first, second, and third electrodes 18a, 18b, and 18c that can be arranged along the ion transport channel 16 within the electrode group 19. Within each electrode group 19, the first electrodes 18a are closest to the feed vessel 12, followed by the second electrodes 18b, and then the third electrodes 18c.

Still referring to the embodiment shown in FIG. 2, the first electrodes 18a in each electrode group 19 are electrically connected in parallel to a first output of the multiphase voltage generator 34. The second electrodes 18b in each electrode group are electrically connected in parallel to a second output of the multiphase voltage generator 34. The third electrodes 18c in each electrode group are electrically connected in parallel to a third output of the multiphase voltage generator 34.

In some embodiments, the ion transport channel 16 contains a salt bridge material.

Figure 3:
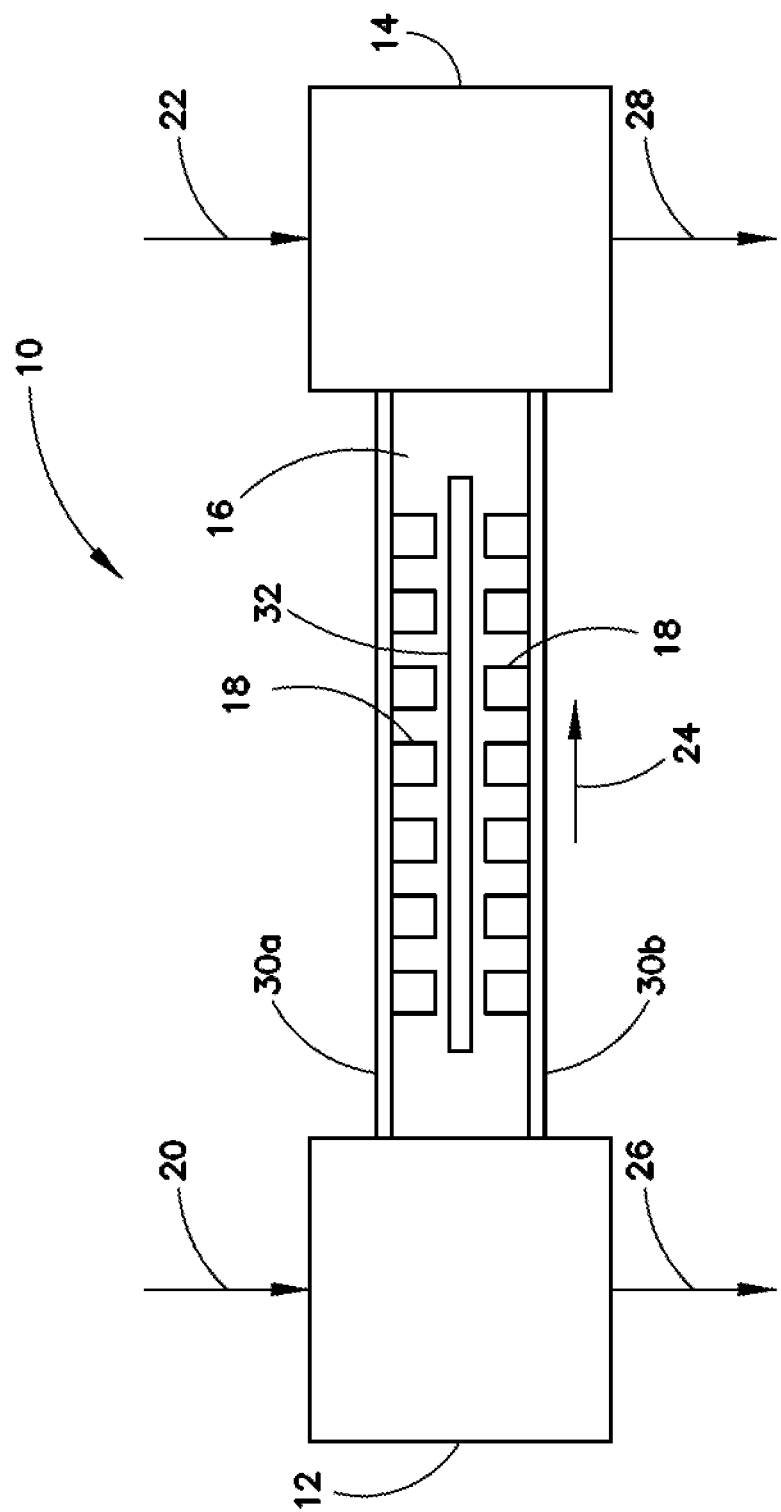
FIG. 3 is a schematic view of an apparatus and method for removing a salt from a source solution in accordance with another embodiment.

Referring now to FIG. 3, in some embodiments, the apparatus 10 further comprises a plurality of plates 30 in a stacked arrangement disposed with the feed vessel 12 and collection vessel 14. The plurality of plates 30 comprises first and second plates 30a and 30b. The electrodes 18 are disposed on or embedded in one or both of the first and second plates 30a and 30b. The first and second plates 30a and 30b are spaced apart from each other to define the ion transport channel 16.

The embodiment shown in FIG. 3 comprises two plates 30a and 30b. However, the plurality of plates 30 may comprise two, three, four, five, six, seven, eight, nine, ten, eleven, twelve, thirteen, fourteen, fifteen, sixteen, seventeen, eighteen, nineteen, twenty, or more plates 30. In some embodiments, the plurality of plates 30 comprises between three and ten plates 30. Where the plurality of plates comprises more than two plates, the plates can define more than two ion transport channels. For example, an apparatus comprising four plates can include three ion transport channels (i.e., one between the first and second plates, one between the second and third plates, and one between the third and fourth plates).

In some embodiments, the plates 30 are printed circuit boards, and the electrodes 18 are printed on the plates 30. In some embodiments, a coating (not shown) is disposed on the surfaces of the printed circuit boards, including the electrodes 18 that are printed on the circuit boards. In some embodiments, the electrodes 18 have a width of between about 2 mils and about 100 mils, in other embodiments between about 4 mils and about 50 mils, in still other embodiments between about 6 mils and about 25 mils, in yet other embodiments between about 8 mils and about 15 mils, and in still yet other embodiments about 10 mils. The width of the electrodes may be understood as the dimension parallel to the surface of the plate. In some embodiments, the electrodes 18 may be spaced apart on the plates. In some embodiments, the distances between the electrodes on the plates may be between about 5 mils and about 50 mils, in other embodiments between about 10 mils and about 25 mils, in still other embodiments between about 12 mils and about 20 mills, and in yet other embodiments about 15 mils.

In some embodiments, the apparatus 10 further comprises a spacer material 32 between the plates 30.

In some embodiments, the spacer material 32 comprises a salt bridge material.

In some embodiments (not shown), the feed vessel 12 and collection vessel 14 can be formed through the plates 30. In other embodiments, the feed vessel 12 and collection vessel 14 can be disposed at the edges of the plates 30 as shown in FIG. 2.

In some embodiments, the coating comprises a poly(p-xylylene) polymer (e.g., Parylene). In other embodiments, the coating is Parylene C. In still other embodiments, the coating is a particulate/epoxy composite or titanate ceramic. In some embodiments, the coating comprises aluminum oxide ($Al_2O_3$), titanium dioxide ($TiO_2$), barium titanate ($BaTiO_3$), or a lead zirconium titanate material of the molecular formula $Pb[Zr_xTi_{1-x}]O_3$, where $0 \leq x \leq 1$. In some embodiments, the coating has a thickness of less than 1 mil or less than 20 microns. In some embodiments, the coating is an insulating (dielectric) material. In some embodiments, the coating exhibits a high permittivity, high volume resistivity, and high maximum allowable electric filed stress. In some embodiments, the coating is applied by chemical vapor deposition or atomic layer deposition.

Referring again to FIG. 1, a method in accordance with one embodiment is described. A source solution is received in the feed vessel 12 as shown by arrow 20. The source solution comprises a solvent and a salt dissolved in the solvent. The salt, in turn, comprises a plurality of ions. A sink solution is received by the collection vessel 14 as shown by arrow 22. Periodic voltage signals are applied to the plurality of electrodes 18. The periodic voltage signals applied to at least some of the respective electrodes are phase offset to induce the ions to move through the ion transport channel 16 from the source solution to the sink solution as shown by arrow 24.

Without intending to be bound by any theory, it is believed that the periodic voltage signals applied to the electrodes 18 produce an electric field in the ion transport channel 16. The electric field is believed to induce the movement of ions through the ion transport channels from the feed vessel (source solution) to the collection vessel (sink solution).

In some embodiments, the method further comprises harvesting a deionized solution from the feed vessel 12 as shown by arrow 26. The source solution can be received by the feed vessel 12, and the deionized solution harvested from the feed vessel 12, substantially simultaneously.

In some embodiments, the method is a flow-through process in which the periodic voltage signals are applied to the electrodes 18 while the source solution flows through the feed vessel 12 and is harvested as the deionized solution. In some embodiments, the flow of the source solution through the feed vessel 12 is substantially orthogonal (e.g., 90±15°) to the direction of ion movement through the ion transport channel 16.

Referring now to FIG. 2, the plurality of electrodes 18 may constitute one or more electrode groups 19 arranged along the ion transport channel 16. For example, the plurality of electrodes 18 may constitute one, two, three, four, five, six, seven, eight, nine, ten, eleven, twelve, thirteen, fourteen, fifteen, sixteen, seventeen, eighteen, nineteen, twenty, or more electrode groups 19. In some embodiments, the plurality of electrodes 18 constitutes between three and eighteen electrode groups 19, in other embodiments between five and fifteen electrode groups 19, and in yet other embodiments between six and twelve electrode groups 19.

Each electrode group 19 comprises a plurality of electrodes 18 arranged along the ion transport channel 16. For example, each electrode group 19 may comprise two, three, four, five, six, seven, eight, nine, ten, eleven, twelve, thirteen, fourteen, fifteen, sixteen, seventeen, eighteen, nineteen, twenty, or more electrodes 18 arranged along the ion transport channel 16. In some embodiments, each electrode group 19 comprises between two and eight electrodes 18, in other embodiments between 3 and 6 electrodes 18, and in yet other embodiments between three and five electrodes 18.

Regardless of the number of electrodes 18 in each electrode group, the electrodes within each electrode group can be arranged along the ion transport channel with the first electrode being closest to the feed vessel, the second electrode being next, followed by the third electrode, etc. The plurality of electrodes 18 making up each electrode group 19 may be segregated from the electrodes 18 making up adjacent electrode groups 19 (as shown in FIG. 2), or the electrodes 18 making up multiple electrode groups 19 may be intermingled along the ion transport channel 16 (not shown).

In some embodiments, the periodic voltage signal applied to each electrode 18 within each electrode group 19 is in phase with the periodic voltage signals applied to the corresponding electrodes in the other electrode groups 19 and is phase offset relative to the periodic voltage signals applied to the other electrodes 18. For example, the periodic voltage signals applied to the first electrodes 18 are in phase, the periodic voltage signals applied to the second electrodes 18 are in phase but are phase offset relative to the periodic voltage signals applied to the first electrodes 18, . . . the periodic voltage signals applied to the tenth electrodes 18 are in phase but are phase offset relative to the periodic voltage signals applied to the first through ninth electrodes 18, etc.).

In some embodiments, the periodic voltage signals are phase offset by an amount equal to the quotient of 360° divided by the number of electrodes 18 in each electrode group 19. In some embodiments, the periodic voltage signal applied to each successive electrode 18 within each electrode group 19 "trails" the periodic voltage signal applied to the preceding electrode 18 by the foregoing quotient. In this instance, a "successive electrode" refers to an electrode that is closer to the collection vessel than a "preceding electrode." For example, in an electrode group 19 comprising three electrodes 18, the periodic voltage signals applied to the second and third electrodes 18 would be phase offset by −120° and −240°, respectively, relative to the periodic voltage signal applied to the first electrode 18. In other embodiments, the periodic voltage signal applied to each successive electrode 18 within each electrode group 19 "leads" the periodic voltage signal applied to the preceding electrode 18 by the foregoing quotient. For example, in an electrode group 19 comprising three electrodes 18, the periodic voltage signals applied to the second and third electrodes 18 would be phase offset by +120° and +240°, respectively, relative to the periodic voltage signal applied to the first electrode 18.

In the embodiment shown in FIG. 2, the apparatus 10 comprises two electrode groups 19, namely a first electrode group 19a and a second electrode group 19b. Each electrode group 19 comprises first, second, and third electrodes 18a, 18b, and 18c arranged along the ion transport channel 16 within the electrode group 19. Within each electrode group 19, the first electrodes 18a are closest to the feed vessel 12, followed by the second electrodes 18b, and then the third electrodes 18c.

In some embodiments, a first periodic voltage signal is applied to the first electrodes 18a. A second periodic voltage signal is applied to the second electrodes 18b. A third periodic voltage signal is applied to the third electrodes 18c. The first, second, and third periodic voltage signals are phase offset from one another by 120°. For example, the second and third periodic voltage signals may be phase offset by −120° and −240°, respectively, or by +120° and +240°, respectively, relative to the first periodic voltage signal.

In some embodiments, the solvent does not pass through the ion transport channel 16 such that the sink solution does not mix with the source solution. For example, the ion transport channel 16 may be filed with a salt bridge material, as defined herein, to allow the flow of ions through the ion transport channel, while preventing water from flowing through the channel.

In some embodiments, the periodic voltage signals each define a waveform having a peak amplitude of no more than about 1 V and a frequency of no more than about 0.2 Hz. In some embodiments, the peak amplitude is between about 0.5 V and about 1 V, in other embodiments between about 0.55 V and 0.8 V, in yet other embodiments between about 0.6 V and about 0.75 V. In other embodiments, the peak amplitude is between about 40 V and about 140 V, in other embodiments between about 65 V and about 115 V, in still other embodiments between about 75 V and about 105 V, in yet other embodiments between about 85 V and about 95 V, and in still yet other embodiments about 90 V. In another embodiment, the peak amplitude is no more than about 100 V. In some embodiments, the frequency is between about 0.01 Hz and about 0.2 Hz, in other embodiments between about 0.012 Hz and about 0.15 Hz, in yet other embodiments between about 0.05 Hz and about 0.1 Hz. In other embodiments, the frequency is between about 0.2 Hz and about 0.8 Hz, in other embodiments between about 0.3 Hz and about 0.7 Hz, in still other embodiments between about 0.4 Hz and about 0.6 Hz, in yet other embodiments between about 0.45 Hz and about 0.55 Hz, and in still yet other embodiments about 0.5 Hz.

Figure 4:
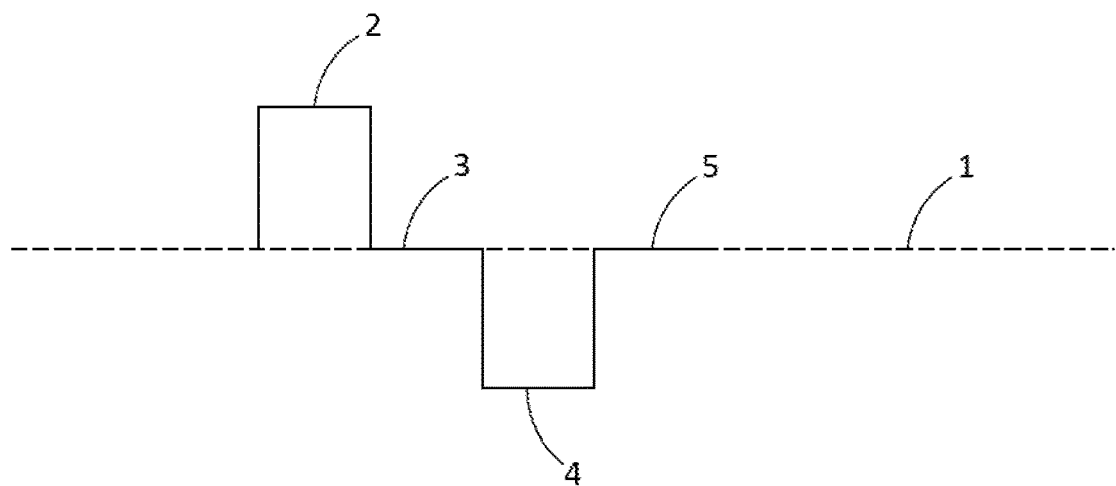
FIG. 4 is a graphical depiction of a step wave.

In some embodiments, the waveform is a sine wave. In other embodiments, the waveform is a square wave, a cosine wave, a triangular wave, or another periodic waveform. In still other embodiments, the waveform is a step wave. In yet other embodiments, the waveform is a step wave described by (+1, 0 −1, 0). The step wave described by (+1, 0, −1, 0) is depicted graphically in FIG. 4. As shown in FIG. 4, the electrical potential described by the waveform varies among a series of fixed values, relative to ground: +1 peak amplitude (2), 0 peak amplitude (3), −1 peak amplitude (4), and 0 peak amplitude (5). The electrical potential of ground is depicted by the dashed line 1.

In some embodiments, the waveform is a step wave of the form (+1, 0 −1, 0), and each electrode group comprises four electrodes arranged along the ion transport channel. The periodic voltage signals applied to the four electrodes in each electrode group may be phase offset by 90% or −90%. For example, where the periodic voltage signals applied to the four electrodes are offset by 90%, the electrical potential of each electrode (as a multiple of the peak amplitude), relative to ground, over one period of the wave may be as shown in the following chart:

|  | 0° | 90° | 180° | 270° | 360° |
|---|---|---|---|---|---|
| First Electrode | +1 | 0 | −1 | 0 | |
| Second Electrode | 0 | +1 | 0 | −1 | |
| Third Electrode | −1 | 0 | +1 | 0 | |
| Fourth Electrode | 0 | −1 | 0 | +1 | |

Figure 5:
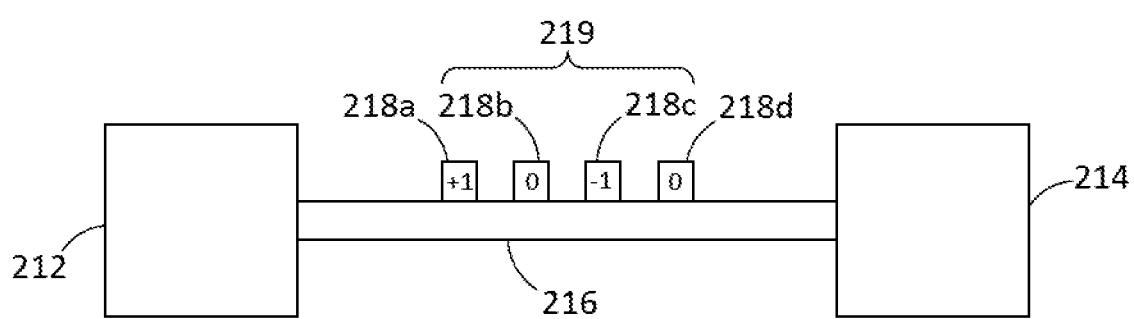
FIG. 5 is a schematic view of an apparatus and method for removing a salt from a source solution in accordance with one embodiment.

FIG. 5 depicts an apparatus 210 having a feed vessel 212, a collection vessel 214, an ion transport channel 216 in ionic communication with the feed vessel 212 and the collection vessel 214, and a plurality of electrodes 218*a*-*d* arranged along the ion transport channel 216. The apparatus comprises a single electrode group 219 having four electrodes, including a first electrode 218*a*, a second electrode 218*b*, a third electrode 218*c*, and a fourth electrode 218*d*. It will be understood, however, that the apparatus 210 may have more than one electrode group 219, such as two, three, four, five, six, seven, eight, nine, ten, eleven, twelve, thirteen, fourteen, fifteen, sixteen, seventeen, eighteen, nineteen, twenty, or more electrode groups 219. FIG. 5 also depicts the electrical potential of each of the four electrodes 218*a*-*d* (as a multiple of the peak amplitude), relative to ground, where the periodic voltage signals applied to the electrodes define a step wave described by (+1, 0, −1, 0), and the periodic voltage signals applied to the four electrodes are phase offset by 90%.

In some embodiments, the solvent is water.

In some embodiments, the salt is sodium chloride.

In some embodiments, the source solution is seawater.

In some embodiments, a coating, as described above, is disposed on the surfaces of the electrodes. In some embodiments, the coating comprises a poly(p-xylylene) polymer (e.g., Parylene). In other embodiments, the coating is Parylene C. In still other embodiments, the coating is a particulate/epoxy composite or titanate ceramic. In some embodiments, the coating comprises aluminum oxide ($Al_2O_3$), titanium dioxide ($TiO_2$), barium titanate ($BaTiO_3$), or a lead zirconium titanate material of the molecular formula $Pb[Zr_xTi_{1-x}]O_3$, where $0 \le x \le 1$. In some embodiments, the coating has a thickness of less than 1 mil or less than 20 microns. In some embodiments, the coating is an insulating (dielectric) material. In some embodiments, the coating exhibits a high permittivity, high volume resistivity, and high maximum allowable electric filed stress. In some embodiments, the coating is applied by chemical vapor deposition or atomic layer deposition.

In some embodiments, the coating prevents electric conduction through any fluid in the ion transport channel and/or reduces electric conduction current, energy consumption, ohmic heating, and/or electrochemical reactions at the electrode/fluid interface. In some embodiments, the coating makes it possible to use periodic voltage signals having larger peak amplitudes without electrolysis of the source or sink solutions. In some embodiments, the periodic voltage signals having larger peak amplitudes generate stronger electric fields in the ion transport channel. In some embodiments, a coating is disposed on the surfaces of the electrodes, and the peak amplitude is between about 40 V and about 140 V, between about 65 V and about 115 V, between about 75 V and about 105 V, between about 85 V and about 95 V, about 90 V, or no more than about 100 V.

Except where the context expressly or impliedly indicates otherwise, the following terms shall be understood to have the following definitions.

The term "source solution" refers to a solution comprising a solvent and a salt dissolved in the solvent. An exemplary source solution is seawater.

The term "sink solution" refers to any liquid medium in which the salts present in the source solution can dissolve or be suspended. In some embodiments, the salts are soluble in the sink solution, and the sink solution is not saturated with the salts in question.

The term "deionized solution" refers to a liquid medium having a lower concentration than the source solution of at least one salt present in the source solution resulting from the salt having been removed from the source solution.

The term "concentrate solution" refers to a liquid medium having a higher concentration than the sink solution of at least one salt present in the source solution resulting from a salt present in the source solution having been transferred to the sink solution to afford the concentrate solution.

The term "receiving," when referring to a method step of "receiving a solution in a vessel," means that the solution enters the vessel. The solution may enter the vessel by any means, including without limitation by being supplied by a human actor and being supplied by natural means in the absence of human intervention (e.g., by gravity, tidal changes, etc.).

The term "solvent" refers to a liquid material suitable to dissolve a salt. Exemplary solvents include water, methanol, dimethyl sulfoxide, etc.

The term "salt" refers to an electrically neutral compound made up of one or more positive ions ionically bonded to one or more negative ions. Exemplary salts include sodium chloride, potassium chloride, gold salts, and silver salts.

The term "ion" refers to an atom or molecule having a net positive or negative charge. Exemplary ions include sodium ($Na^+$), potassium ($K^+$), chloride ($Cl^-$), gold ($Au^{2+}$ and $Au^{3+}$), and silver ($Ag^+$).

The term "feed vessel" refers to any vessel suitable for holding a liquid solution, including without limitation a pipe, tube, tank, bucket, chamber, etc.

The term "collection vessel" refers to any vessel suitable for holding a liquid solution, including without limitation a pipe, tube, tank, bucket, chamber, etc.

The term "arranged along" means disposed along the length of. For example, a plurality of electrodes are said to be "arranged along an ion transport channel" if the electrodes are at disposed at various distances from one end of the ion transport channel, i.e., one or more of the electrodes is disposed at a greater distance from one end of the ion transport channel than one or more other electrodes. Further, the various electrodes may be disposed on one or more sides of the ion transport channel, so long as the various electrodes are disposed at various distances from one end of the ion transport channel. In some embodiments, the term "arranged along" may be understood to mean "arranged sequentially along" or "arranged sequentially at uniform intervals along."

The term "arranged sequentially along" means disposed at distinct positions along the length of. For example, a plurality of electrodes are said to be "arranged sequentially along an ion transport channel" if each of the electrodes is disposed at a different distance from one end of the ion transport channel.

The term "arranged sequentially at uniform intervals along" means disposed at distinct positions separated by uniform intervals along the length of. For example, a plurality of electrodes are said to be "arranged sequentially at uniform intervals along an ion transport channel" if each of the electrodes is disposed at a different distance from one end of the ion transport channel, and the distance between each pair of adjacent electrodes is substantially equal.

The term "periodic voltage signal" refers to an electrical potential, relative to ground, that varies in a periodic fashion. A periodic voltage signal may be described by any periodic waveform, including a sine wave, a cosine wave, a square wave, a triangular wave, or any other periodic waveform.

The term "peak amplitude," when used in reference to the waveform defining a periodic voltage signal, refers to the absolute value of the maximum electrical potential, relative to ground, provided by the waveform.

The term "frequency," when used in reference to the waveform defining a periodic voltage signal refers to the number of cycles of the periodic voltage signal occurring per unit time. The frequency may be expressed in units of Hz (cycles per second). Generally, one "cycle" of a waveform corresponds to 360°.

The term "step wave" refers to a waveform in which the electrical potential of an electrode, relative to ground, varies among a series of fixed values. In some embodiments, the electrical potential of the electrode remains at each fixed value for an equal period of time during each period of the wave. For example, the electrical potential may vary among four fixed values, remaining at each fixed value for one-fourth of the period of the wave. In other embodiments, the electrical potential remains at different fixed values for different periods of time during each period of the wave. For example, the electrical potential may vary among four fixed values, remaining at the first and third fixed values for three-eighths of the period of the wave and remaining at the second and fourth fixed values for one-eighth of the period of the wave. The electrical potential may vary between any number of fixed values during each period of the wave. For example, the electrical potential may vary between two values, three values, four values, five values, six values, seven values, eight values, nine values, ten values, or more than ten values. In some embodiments, the electrical potential varies among a number of fixed values that is equal to the number of electrodes in each electrode group. For example, the electrical potential may vary among four fixed values when there are four electrodes in each electrode group.

The following notation is used herein to describe a step wave: $(a_1(b_1), a_2(b_2), a_3(b_3), \ldots a_n(b_n))$, where the electrical potential varies among n fixed values, $a_i$ represents each fixed value of the electrical potential (as a fraction of the peak amplitude), and $b_i$ represents the period of time for which the electrical potential remains at each fixed value (as a percentage of the period of the wave). Where $b_i$ is not specified, it is understood that the electrical potential remains at each fixed value for an equal period of time. For example, a step wave described by (+1, 0, −1, 0) is a step wave in which the electrical potential of a given electrode varies from a fixed value of +1 peak amplitude, to a fixed value of 0, to a fixed value of −1 peak amplitude, to a fixed value of 0, and remains at each fixed value for 25% (one-fourth) of the period of the wave.

The term "electrode" refers to any electrical conductor suitable to hold an electrical potential relative to ground. Suitable electrode materials include but are not limited to copper and aluminum. In some embodiments, the electrode material is carbon, in other embodiment electro deposited carbon.

The term "electrode group" refers to a group of two or more electrodes configured, as herein described, to receive phase offset periodic voltage signals. In the apparatus described herein, the electrodes in an electrode group generally are arranged along the ion transport channel.

The term "ion transport channel" refers to any vessel, pipe, tube, opening, or other path through or along which ions can travel.

The term "salt bridge material" refers to any material suitable to allow the flow of ions between two vessels while keeping the contents of the two vessels separate. In some embodiments, the salt bridge material is an ion conducting material. In some embodiments, the salt bridge material is a gel or aerogel. In some embodiments, the salt bridge material is sodium chloride, potassium chloride, potassium nitrate solutions gelled with agar, or a polymer electrolyte (e.g., an acrylamide polymer).

The term "ionic communication" refers to the ability of ions to move between two vessels. In other words, two vessels are said to be in ionic communication if ions in one vessel are free to move to the other vessel.

The term "phase offset," when used to refer to the periodic voltage signals applied to two or more electrodes, means that the waveforms defining the periodic voltage signals are out of phase and, in some embodiments, that the waveforms defining the periodic voltage signals for the various electrodes are out of phase by a uniform amount.

The term "aqueous solution" refers to a solution in which the solvent is water.

The term "multiphase voltage generator" refers to a device suitable for providing phase offset periodic voltage signals to a plurality of electrodes. The term encompasses a plurality of voltage generators working in concert to provide the phase offset periodic voltage signals, as well as a single voltage generator providing all of the phase offset periodic voltage signals simultaneously, or some combination thereof.

Suitable devices are well-known in the art. For example, a three-phase generator can be realized by populating an Excel spread sheet with vertical and horizontal values representing the value of the waveform and time, respectively. A programmable logic array (PLA) may be used to generate phase offset waveforms corresponding to the waveform in the Excel sheet. A CPU clock provides a clocking frequency presenting the spread sheet values in a serial manner to a digital to analogue D/A converter. The clocking frequency correlates to the period of a phase.

In embodiments using multi phase AC electrical generation, several connection strategies are possible. In a three phase example, a Y connection with a common ground signal of each phase may be electrically connected to the first inner circular electrode positioned in the vicinity of the feed channel. This connection location can uniquely determine the direction of motivation of the electric field within the ion channel, and thus the direction of ion flow. Alternatively the opposite direction of ion flow along the channel can be realized by selectively grounding the outside perimeter electrode of the disc. In another three phase example, a Delta multiphase connection may be accommodated.

The term "electrically connected" refers to one or more connections that permit that flow of electrons.

The term "plate" refers to a planar surface, such as a thin, flat sheet of material. The plates described herein may be manufactured from fiberglass circuit board material, ceramic, or any other suitable material. The plates may have any shape, including circular, rectangular, square, triangular, pentagonal, oval-shaped, or any other suitable shape. The plates may have any suitable thickness, in some embodiments between about 1/32" and 1/4", in other embodiments between about 3/64" and 1/8", and in yet other embodiments about 1/16". The plates may have any diameter or width, in some embodiments between about 3" and about 36", in other embodiments between about 6" and about 18", in yet other embodiments between about 6" and about 12".

The term "stacked arrangement," when referring to the plates described herein, refers to an arrangement in which a plurality of plates are aligned with their largest surfaces facing one another.

The term "spaced apart," when referring to the plates described herein in a stacked arrangement, means that all or part of the plates are physically separated from each other, either with empty space between the plates or with another material (such as a spacer material) occupying the space between the plates. In some embodiments, the space between adjacent plates is between about 0.01 mm and 0.02 mm.

The term "spacer material" refers to a material that may be inserted between a plurality of plates in a stacked arrangement in order to provide a space between the plates (i.e., such that the plates are spaced apart). In some embodiments, the spacer material allows ion transport whilst inhibiting water transport (e.g., a salt bridge material).

Figure 6A:
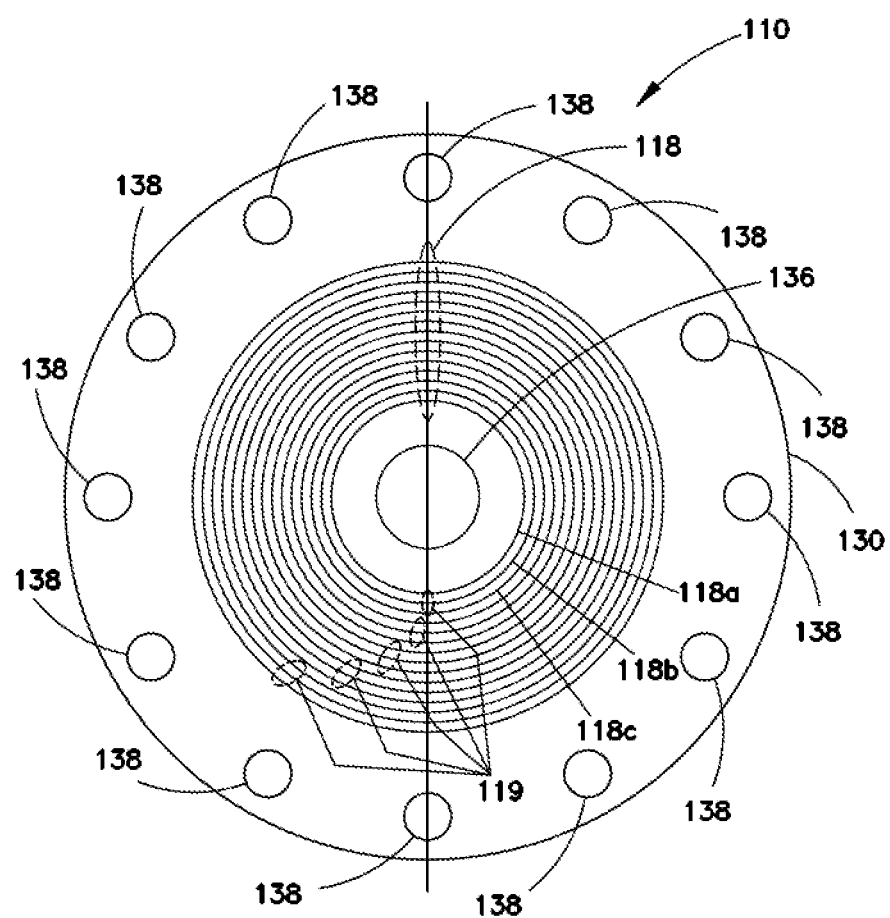
FIG. 6a is a top view of an apparatus for removing a salt from a source solution in accordance with one embodiment.
Figure 6B:
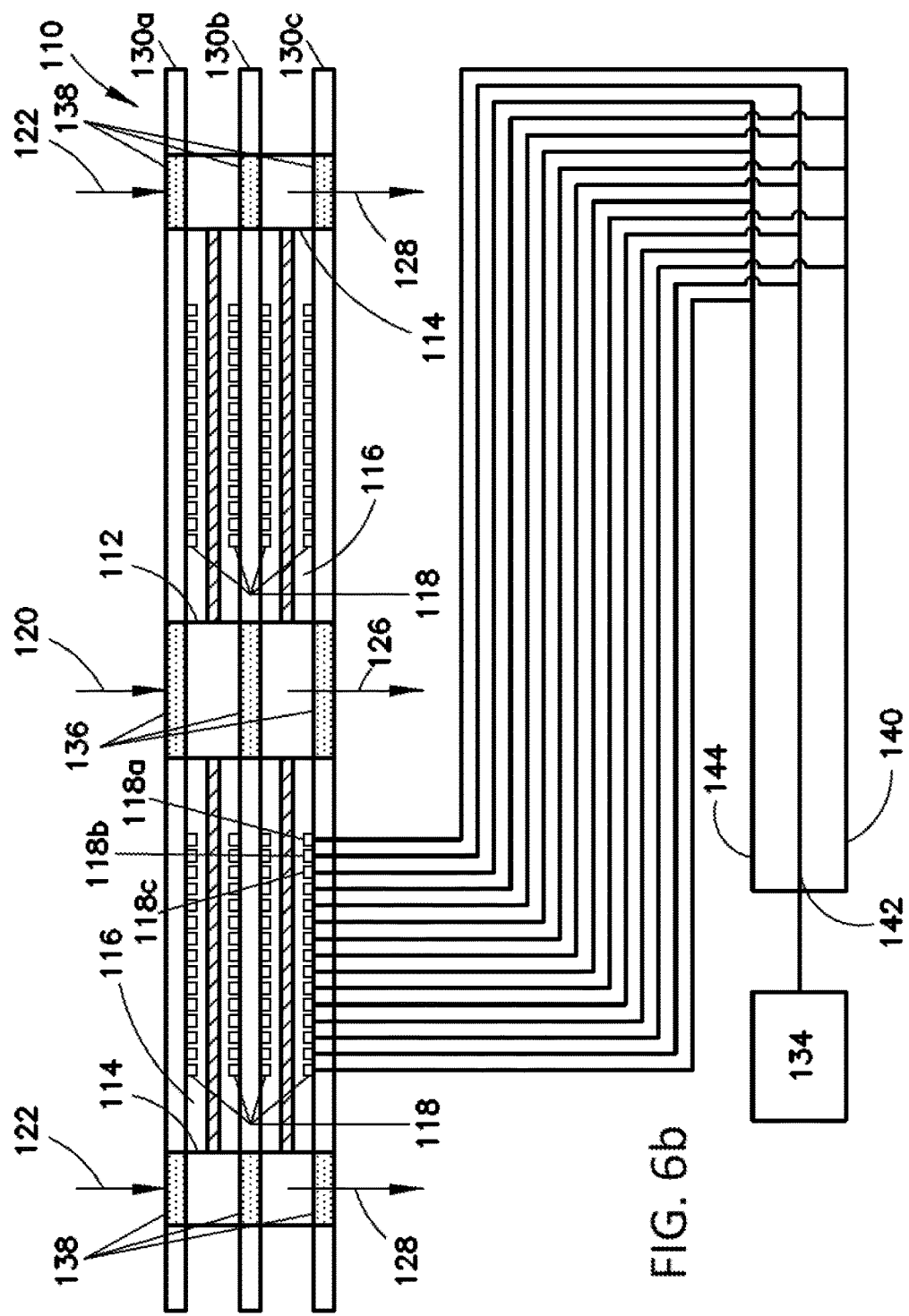

Referring now to FIGS. 6a and 6b, an apparatus 110 for removing a salt from a source solution in accordance with one embodiment is described. The apparatus 110 comprises a plurality of circular plates 130 in a stacked arrangement.

A plurality of circular electrodes 118 are disposed on the surface of, or embedded in, each circular plate 130. The circular electrodes 118 are substantially concentric with the circular plate 130. For example, the center of the circle defined by each circular electrode 118 may be displaced from the center of the circular plate 130 by no more than 25% of the radius of the electrode, in some embodiments no more than 15%, and in other embodiments no more than 5%.

The circular plates 130 have a plurality of perforations (i.e., holes), including a central perforation 136 and a plurality of peripheral perforations 138, formed therethrough. The central perforation 136 can be located substantially at the center of the circular plate 130. For example, where the central perforation 136 has a circular shape, as shown in FIG. 6a, the center of the circle defined by the central perforation 136 may be displaced from the center of the circular plate 130 by no more than 25% of the radius of the circular plate 130, in some embodiments no more than 15%, and in other embodiments no more than 5%. The central perforation 136 is within the circles defined by the circular electrodes 118. The peripheral perforations 138 are outside of the circles defined by the circular electrodes 118, near the periphery of the circular plate 130.

Referring now to FIG. 6b, the circular plates 130 of apparatus 110 are in a stacked arrangement. As drawn in the example of FIG. 6b, the apparatus 110 comprises three circular plates 130, including first circular plate 130a, second circular plate 130b, and third circular plate 130c. However, an apparatus similar to the apparatus 110 may comprise more or less than three circular plates 130, so long as the apparatus comprises at least two circular plates 130.

The circular plates 130 in the apparatus 110 are situated in a stacked arrangement with the central perforations 136 and peripheral perforations 138 of the plates aligned. The aligned central perforations 136 define a feed vessel (or feed channel) 112 through the center of the stacked circular plates 130. The aligned peripheral perforations 138 define a plurality of collection vessels (or collection channels) 114 near the periphery of the plates 130.

The circular plates 130 are separated by a spacer material 132, which is situated between the circular plates 130 but does not block the central perforations 136 or peripheral perforations 138. The spacer material 132 is substantially impermeable to the flow of water, but does not block the flow of ions. In some embodiments, the spacer material 22 is a salt bridge material. Thus, the spacers 132 between the plates 130 define ion transport channels 116. For the sake of clarity, a gap between the spacer material 132 and the plates 130 is shown in FIG. 6b. However, the plates 130 can be in contact with the spacer material 132.

Referring back to FIG. 6a, the circular electrodes 118 may constitute electrode groups 119. Each electrode group 119 may comprise a first electrode 118a, a second electrode 118b, and a third electrode 118c. In FIGS. 6a and 4b, the first, second, and third electrodes 118a-c are labeled only in the in the electrode group 119 closest to the center of the circular plate 130. However, it is understood that each electrode group 119 may include first, second, and third electrodes 118a-c. In each electrode group 119, the first electrode 118a is closest to the center of the circular plate 130, followed by the second electrode 118b and then the third electrode 118c.

Referring now to FIG. 6b, the electrodes 118 are electrically connected to a voltage generation source, such as multiphase voltage generator 134, by electrical connections 140, 142, and 144. More specifically, the first electrodes 118a are electrically connected in parallel to the multiphase voltage generator 134 by the first electrical connection 140. The second electrodes 118b are electrically connected in parallel to the multiphase voltage generator 134 by the second electrical connection 142. The third electrodes 118c are electrically connected in parallel to the multiphase voltage generator 134 by the third electrical connection 144. For the sake of clarity in FIG. 6b, the electrical connections 140, 142, and 144 between the multiphase voltage generator 134 and the electrodes 118 are shown only for some of the electrodes 118. However, it is understood that the multiphase voltage generator 134 is electrically connected to the other electrodes 118 in an analogous manner.

The apparatus 110 may be used in a method for removing a salt from a source solution in accordance with one embodiment. The feed vessel 112 receives a source solution comprising a solvent and a salt dissolved in the solvent. The collection vessel 114 receives a sink solution. Periodic voltage signals are applied to the circular electrodes 118 using the multiphase voltage generator 134 to induce the ions making up the salt to move through the ion transport channels 116 from the source solution to the sink solution.

The foregoing method may be performed as either a static method or as a flow-through method. In the static method, the source solution and sink solution are supplied to the feed vessel 112 and collection vessel 114, respectively. After the periodic voltage signals are applied to the electrodes 118, a deionized solution (derived from the source solution) is collected from the feed vessel 112, and a concentrate solution (derived from the sink solution with the ions transferred from the source solution) is collected from the collection vessel 114.

In the flow-through method, the feed vessel 112 receives the source solution, and the collection vessel 114 receives the sink solution, as shown by arrows 120 and 122, respectively. At the same time, periodic voltage signals are applied to the electrodes 118 using the multiphase voltage generator 134 to induce the ions of the salt to move through the ion transport channels 116 from the source solution to the sink solution. The source and sink solutions flow through the feed and collection vessels 112 and 114, respectively. As the source solution flows through the feed vessel 112, the ions in the source solution are transferred through the ion transport channels 116 to the sink solution, decreasing the salt concentration in the source solution. Similarly, as the sink solution flows through the collection vessel 114, the salt concentration in the sink solution increases. The deionized solution is harvested from the feed vessel 112 as shown by arrow 126, and the concentrate solution is harvested from the collection vessel 114 as shown by arrow 128.

Figure 7:
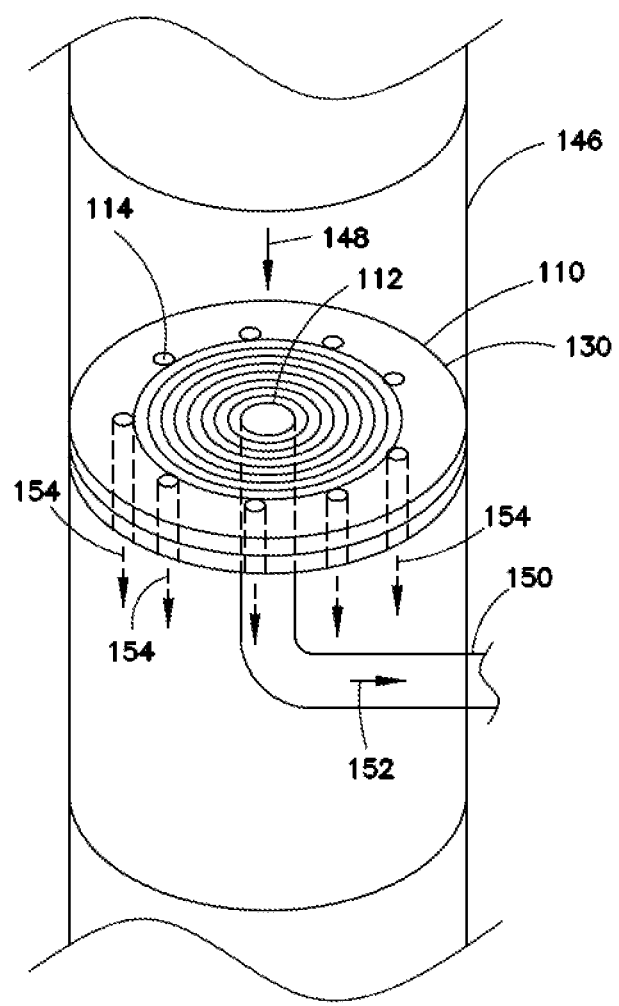
FIG. 7 is a side view of the apparatus of FIGS. 4a and 4b situated in a pipe with a portion of the pipe cut away to reveal the apparatus.

Referring now to the example of FIG. 7, when the apparatus 110 is to be used in a flow-through method, the apparatus 110 may be situated in the lumen of a pipe 146. The solution from which salt is to be removed flows into the feed vessel 112 and the collection vessels 114 as shown by arrow 148. Thus, in this embodiment, the same solution serves as both the source solution and the sink solution. The edges of the circular plates 130 are sealed to the inside of the pipe 146 to prevent the solution from flowing around the apparatus 110. The deionized solution exiting the feed vessel 112 is captured by a tube 150 as shown by arrow 152 and may be used for applications requiring fresh water. The concentrate solution exiting the collection vessels 114 continues to flow through the pipe 146 as shown by arrows 154 and may be discarded or subject to further processing.

Figure 8:
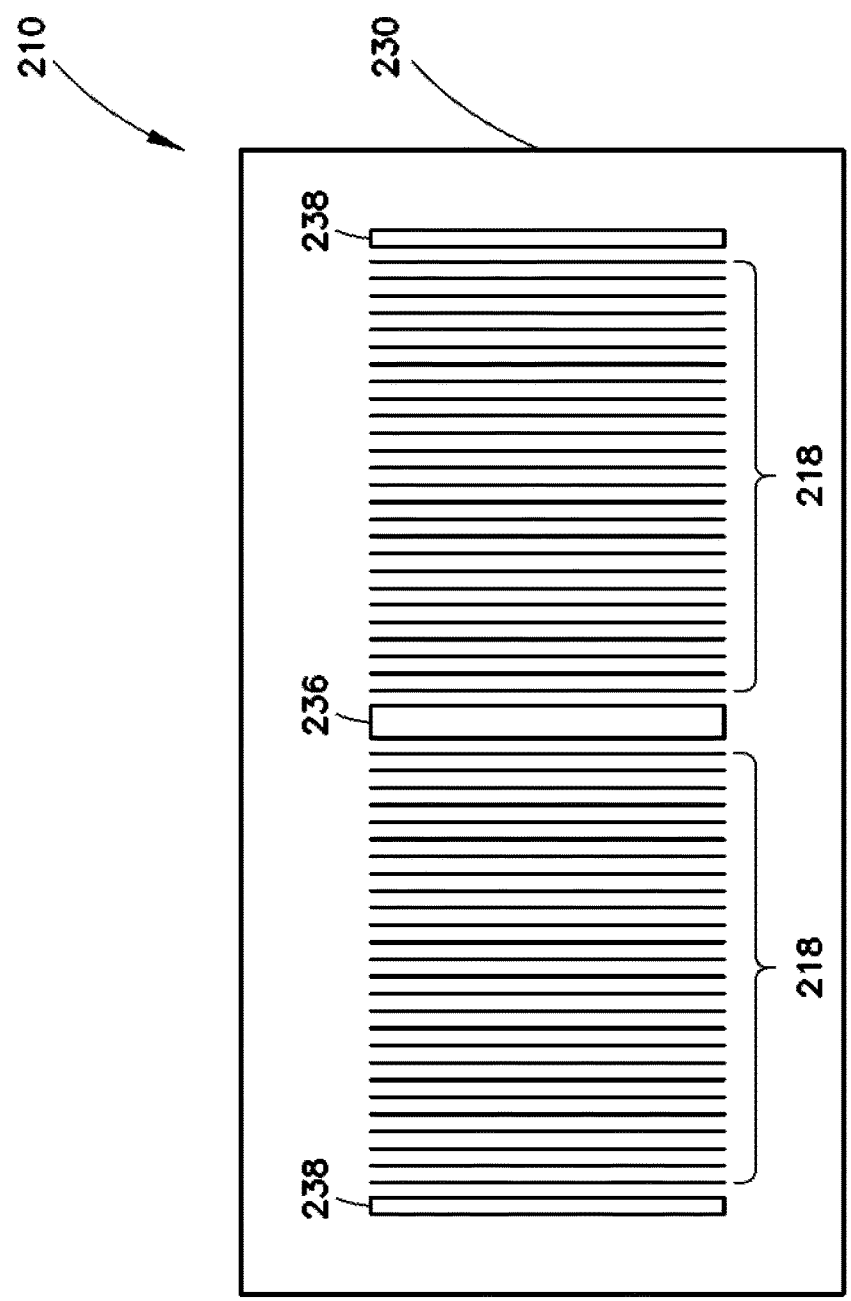
FIG. 8 is a top view of an apparatus for removing a salt from a source solution in accordance with another embodiment.

Referring now to the example of FIG. 8, an apparatus 210 for removing a salt from a source solution in accordance with another embodiment is described. The apparatus 210 comprises a plurality of rectangular plates 230 in a stacked arrangement. Except for the configuration of the rectangular plates 230, described below, the apparatus 210 is analogous to the apparatus 110 described above in connection with FIGS. 6a, 6b, and 7. The discussion above regarding apparatus 110 therefore is also pertinent to the apparatus 210.

A plurality of linear electrodes 218 are disposed on the surface of, or embedded in, each rectangular plate 230. The rectangular plates 230 have a central perforation 236 and two peripheral perforations 238 formed therethrough. The central perforation 236 is an elongate slit located substantially halfway between the two ends of the rectangular plate 230 and is substantially parallel to the two ends. The peripheral perforations 238 are elongate slits and are located adjacent the two ends of the rectangular plate 230 and are substantially parallel to the two ends. The linear electrodes 218 are disposed between the central perforation 236 and the peripheral perforations 238 and are substantially parallel to the perforations and the ends of the rectangular plate 230.

Figure 9:
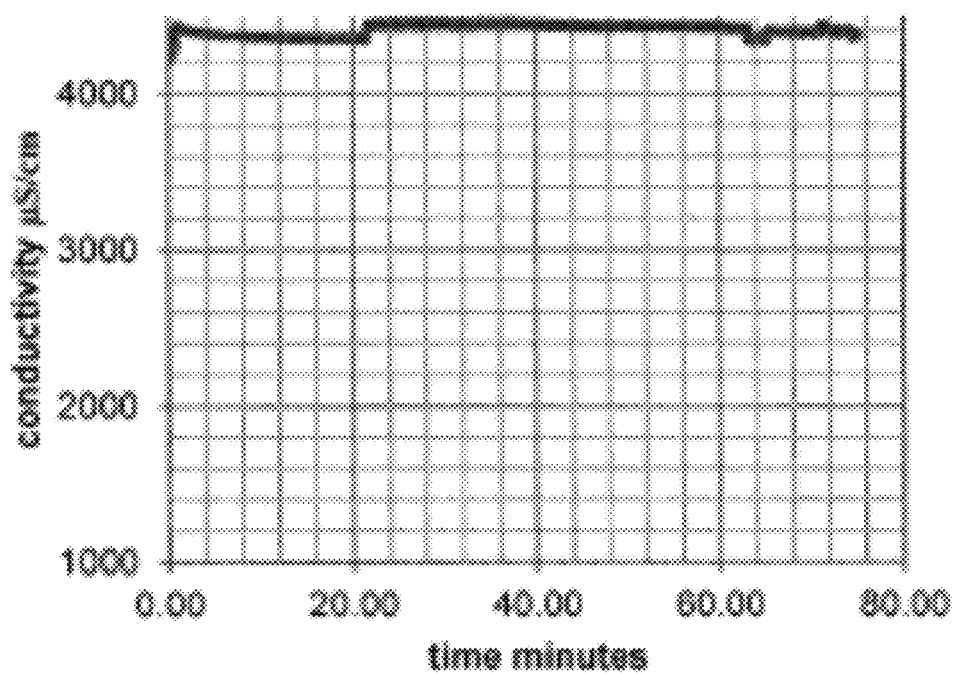
FIG. 9 is a plot of electrical conductivity versus time depicting data obtained in an example control experiment.

Referring now to FIG. 9, an apparatus 310 for removing a salt from a source solution in accordance with yet another embodiment is described. The apparatus 310 is a thin flexible rectangular plate and associated spacer both having appropriate dimensions to permit the sandwich assembly to be rolled up and inserted into a circular housing. The electrode plurality aligned perpendicular to the axial dimension of the tube. The feed channel comprising one end cap manifold and the concentrate comprising the other end cap manifold.

EXAMPLES

In order that this disclosure be more fully understood, the following examples are set forth. These examples are for the purpose of illustration only and are not to be construed as limiting the scope of the disclosure in any way.

Apparatus Setup.

An apparatus similar to the apparatus depicted in FIGS. 6a and 6b, and described above, was used in the following examples. The apparatus consisted of five circular plates in a stacked arrangement. Each plate had a thickness of 1.6 mm and a diameter of 150 mm. A 0.014 mm separation mesh was used as a spacer material between the plates. Two polycarbonate discs and four clamps were used to hold the stack together.

The plates were printed with a concentric arrangement of copper electrodes on each side of the plates as shown in FIGS. 6a and 6b. The electrodes comprised five electrode groups on each side of each plate, with each group comprising three electrodes.

Experimental Procedure.

The feed vessel and collection vessels of the apparatus were charged with an approximately 17 ppt solution of sodium chloride in water in analogy to the static process described above. Except where otherwise specified, periodic voltage signals described by sine waves were applied to the electrodes at the peak amplitudes and frequencies specified in each example. Except where otherwise specified, the sine waves defining the periodic voltage signals applied to the second and third electrode in each electrode group were phase offset by −120 degrees and −240 degrees, respectively, relative to the sine wave defining the periodic voltage signal applied to the first electrode in each electrode group.

The transfer of ions from the source solution (in the feed vessel) to the sink solution (in the collection vessels) was measured by measuring the decrease in electrical conductivity within the feed vessel with a Hamilton conductivity sensor. Electrical conductivity is a proxy for ion concentration, with a decrease in conductivity corresponding to a decrease in ion concentration. Results were reported as the percentage decrease in conductivity within the feed vessel.

Control.

As a control, the conductivity of the solution in the feed vessel was measured over time in the absence of any periodic voltage signals. As shown in FIG. 9, the conductivity of the solution in the feed vessel did not change substantially over a period of about 75 minutes, indicating that ions were not transferred from the source solution to the sink solution in the absence any voltage signals. The slight variations in conductivity shown in FIG. 9 are believed to stem from cell charging, cell polarization, or solvent evaporation.

Example 1

Figure 10:
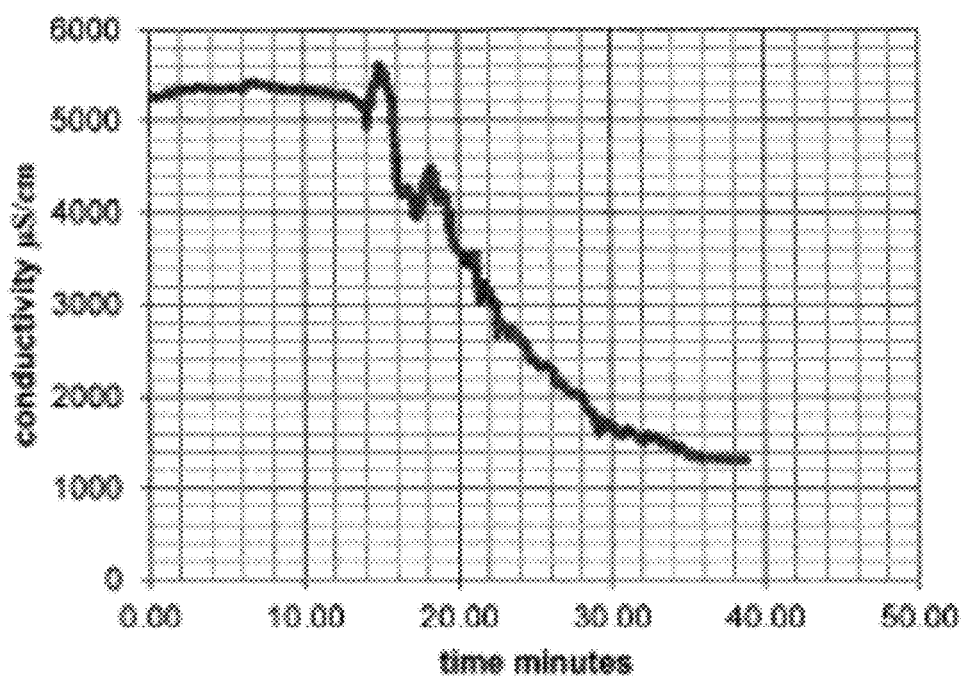
FIG. 10 is a plot of electrical conductivity versus time depicting data obtained in the experiment of Example 1.

Periodic voltage signals having a peak amplitude of 0.6 V and a frequency of 0.1 Hz were applied to the electrodes, and the conductivity of the solution in the feed vessel was measured over time. As shown in FIG. 10, the conductivity of the solution in the feed channel decreased by about 70%.

Example 2

Figure 11:
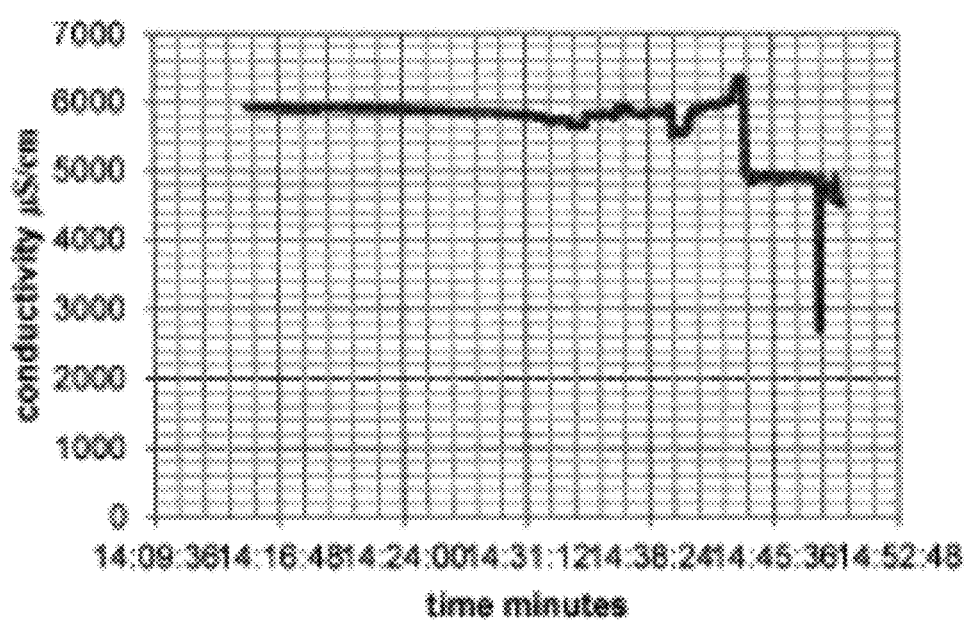
FIG. 11 is a plot of electrical conductivity versus time depicting data obtained in the experiment of Example 2.

Periodic voltage signals having a peak amplitude of 0.6 V and a frequency of 0.5 Hz were applied to the electrodes, and the conductivity of the solution in the feed vessel was measured over time. As shown in FIG. 11, only marginal changes in the conductivity of the solution in the feed channel were observed.

Example 3

Figure 12:
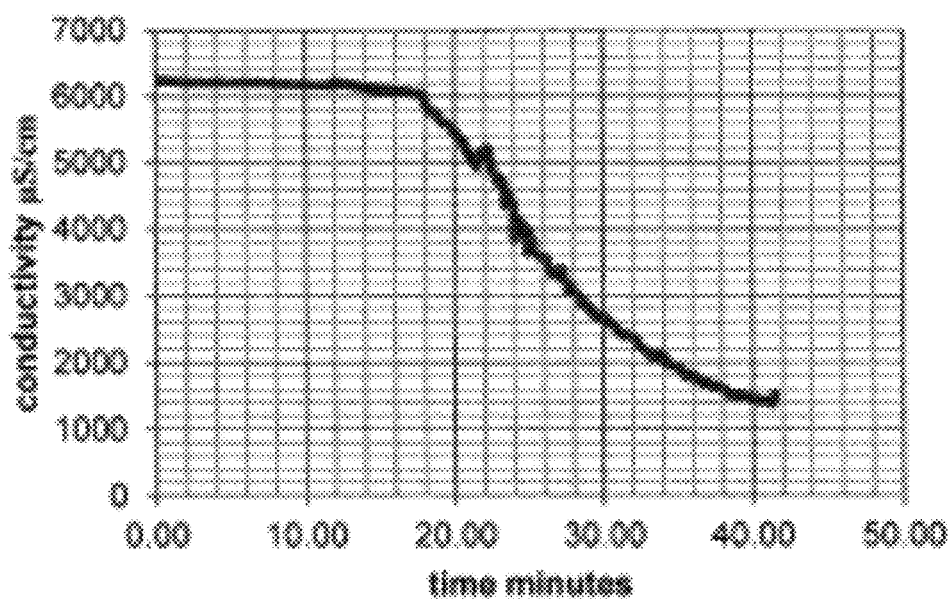
FIG. 12 is a plot of electrical conductivity versus time depicting data obtained in the experiment of Example 3.

Periodic voltage signals having a peak amplitude of 0.6 V and a frequency of 0.05 Hz were applied to the electrodes, and the conductivity of the solution in the feed vessel was measured over time. As shown in FIG. 12, a steady drop in conductivity over time was observed.

Example 4

Figure 13:
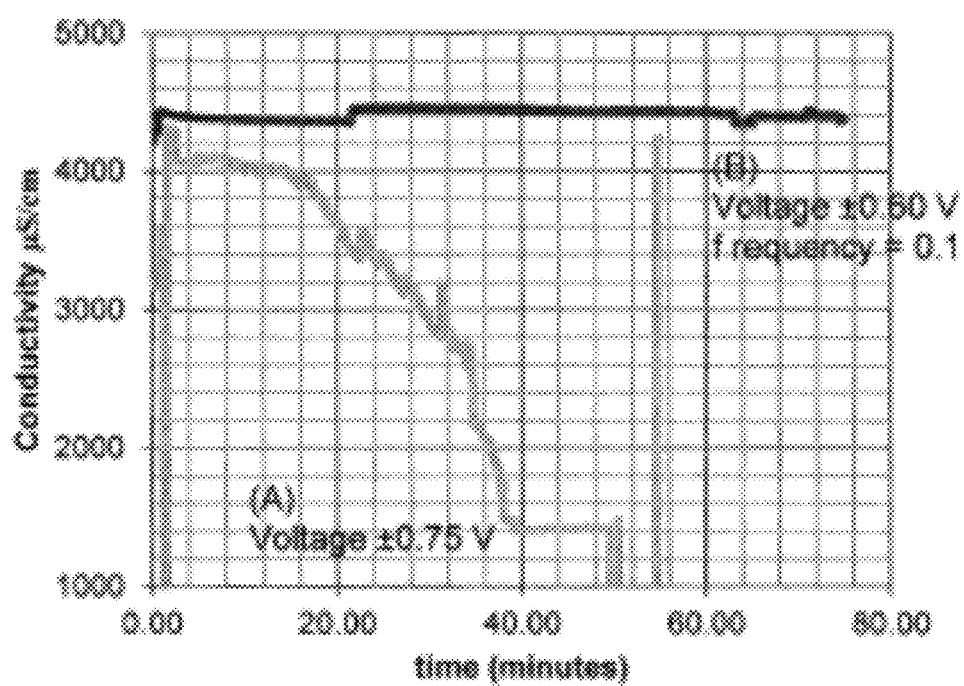
FIG. 13 is a plot of electrical conductivity versus time depicting data obtained in the experiment of Example 4.

Periodic voltage signals having a peak amplitude of 0.6 V and a frequency of 0.1 Hz were applied to the electrodes, and the conductivity of the solution in the feed vessel was measured over time. As shown in FIG. 13, only marginal changes in the conductivity of the solution in the feed channel were observed.

Example 5

Figure 14:
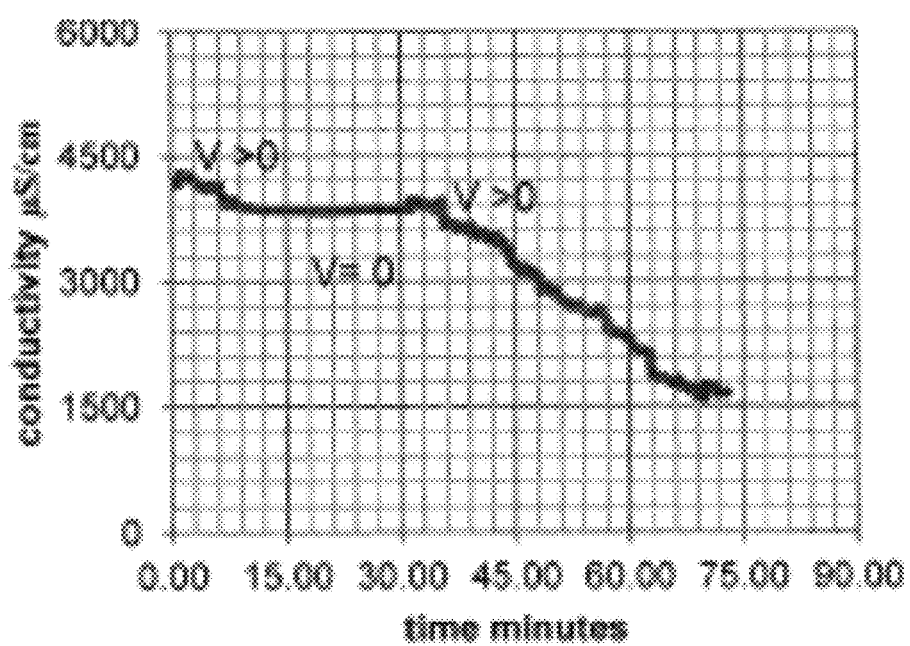
FIG. 14 is a plot of electrical conductivity versus time depicting data obtained in the experiment of Example 5.

Periodic voltage signals having a peak amplitude of 0.6 V and a frequency of 0.012 Hz were applied to the electrodes, with a temporary voltage shut-off, and the conductivity of the solution in the feed vessel was measured over time. As shown in FIG. 14, a steady drop in conductivity over time was observed during the times when the periodic voltage signals were applied. During the temporary voltage shut-off, no decrease in conductivity was observed.

Example 6

Figure 15:
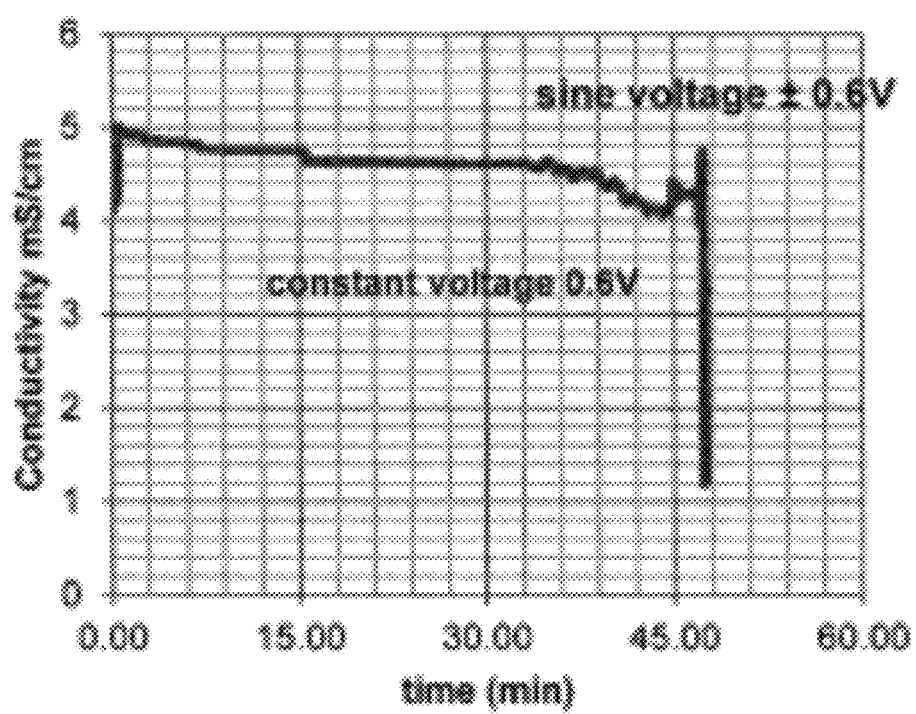
FIG. 15 is a plot of electrical conductivity versus time depicting data obtained in the experiment of Example 6.

A constant voltage of 0.6 V was applied to all electrodes, and the conductivity of the solution in the feed vessel was measured over time. As shown in FIG. 15, only marginal changes in the conductivity of the solution were measured during the period of constant voltage. After 33 minutes, periodic voltage signals having a peak amplitude of 0.6 Hz and a frequency of 0.012 H were applied to the electrodes, which resulted in a decrease in the conductivity over time.

Example 7

Figure 16:
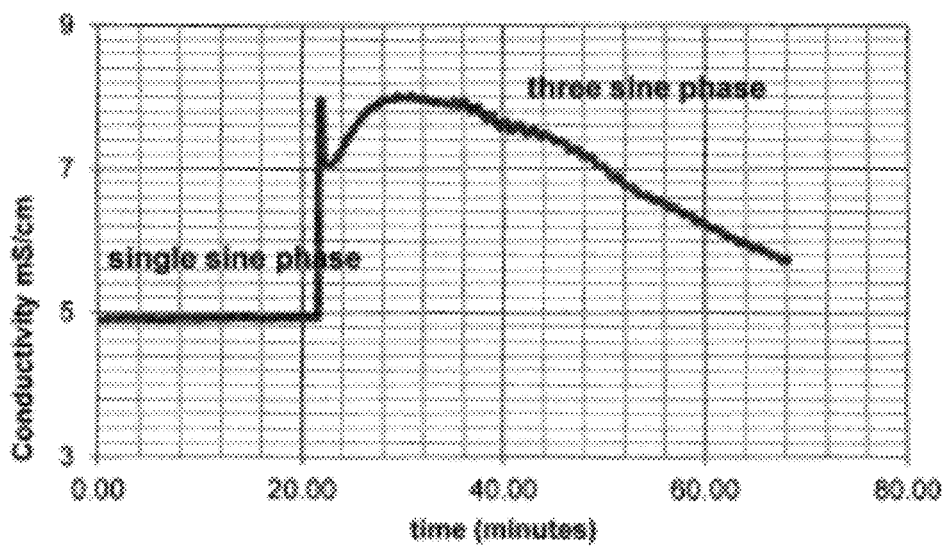
FIG. 16 is a plot of electrical conductivity versus time depicting data obtained in the experiment of Example 7.

Periodic voltage signals having a peak amplitude of 0.6 V and a frequency of 0.012 Hz were applied to the electrodes, but the voltage signals were not phase offset. The conductivity of the solution in the feed vessel was measured over time. As shown in FIG. 16, no changes in conductivity were observed in over 20 minutes. After 20 minutes, the phase offset periodic voltage signals resumed, resulting in a decrease in the conductivity over time.

Example 8

Figure 17:
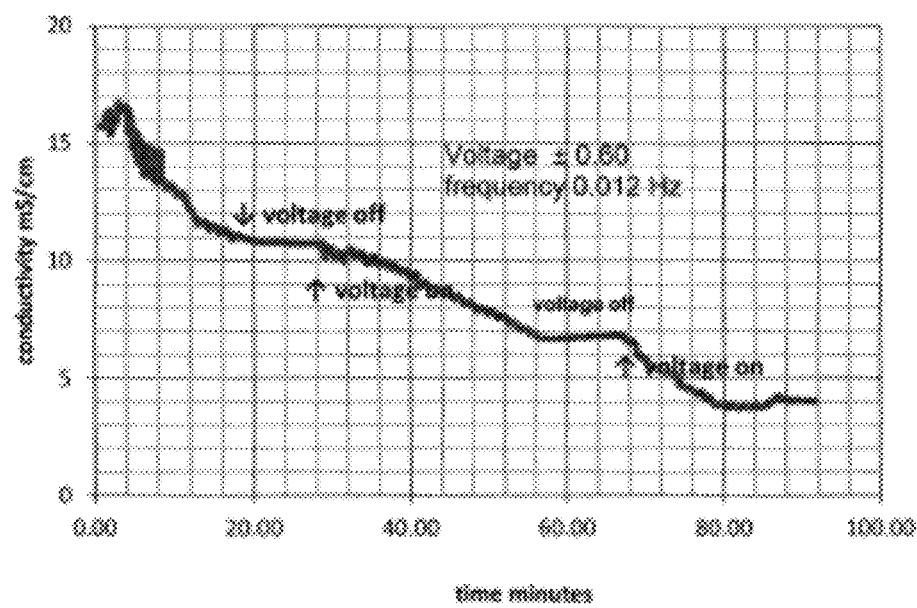
FIG. 17 is a plot of electrical conductivity versus time depicting data obtained in the experiment of Example 8.

Periodic voltage signals having a peak amplitude of 0.6 V and a frequency of 0.12 Hz were applied to the electrodes in the presence of a 0.5 M solution of sodium chloride in water, and the conductivity of the solution in the feed vessel was measured over time. As shown in FIG. 17, the conductivity decreased during the time periods when the periodic voltage signals were applied, but did not decrease during the time periods when the voltage was turned off.

The invention claimed is:

1. A method for removing a salt from a source solution, the method comprising:
   receiving the source solution in a feed vessel, the source solution comprising a solvent and a salt dissolved in the solvent, the salt comprising a plurality of ions;
   receiving a sink solution in a collection vessel; and
   applying periodic voltage signals to a plurality of electrodes arranged along an ion transport channel which is in ionic communication with the feed vessel and the collection vessel, wherein the plurality of electrodes constitutes a plurality of electrode groups arranged along the ion transport channel, each electrode group comprising a first electrode and a second electrode arranged along the ion transport channel, and wherein:
   a first periodic voltage signal is applied to the first electrodes,
   a second periodic voltage signal is applied to the second electrodes, and
   the first periodic voltage signal is phase offset from the second periodic voltage signal to induce the ions to move through the ion transport channel from the source solution to the sink solution.

2. The method of claim 1, wherein each electrode group further comprises a third electrode and a fourth electrode, and wherein:
   a third periodic voltage signal is applied to the third electrodes,
   a fourth periodic voltage signal is applied to the fourth electrodes,
   the third periodic voltage signal is phase offset from the first and second periodic voltage signals, and
   the fourth periodic voltage signal is phase offset from the first, second, and third periodic voltage signals.

3. The method of claim 1, further comprising harvesting a deionized solution from the feed vessel, and wherein said supplying the source solution and said harvesting the deionized solution are performed substantially simultaneously.

4. The method of claim 1, wherein the solvent does not pass through the ion transport channel.

5. The method of claim 1, wherein the periodic voltage signals define a waveform having a peak amplitude of no more than about 1 V and a frequency of no more than about 0.2 Hz or a waveform having a peak amplitude of between about 40 V and about 140 V and a frequency of between about 0.2 Hz and 0.8 Hz.

6. The method of claim 5, wherein the waveform is a sine wave or a step wave described by (+1, 0, −1, 0).

7. The method of claim 1, wherein the solvent is water, and the salt is sodium chloride.

8. The method of claim 1, wherein the feed vessel and collection vessel are disposed with a plurality of plates in a stacked arrangement, the plurality of plates comprising first and second plates, wherein the electrodes are disposed on or embedded in one or both of the first and second plates, and wherein the first and second plates are spaced apart from each other to define the ion transport channel.

9. The method of claim 8, wherein a spacer material comprising a salt bridge material is disposed between the plates.

10. The method of claim 8, wherein perforations in the plates define the feed vessel and the collection vessel.

11. The method of claim 1, wherein a coating comprising a poly(p-xylylene) polymer is disposed on the surfaces of the electrodes.

* * * * *